(12) United States Patent  
Mamié

(10) Patent No.: US 8,439,610 B2  
(45) Date of Patent: May 14, 2013

(54) LOAD SECURING ELEMENT AND SYSTEM FOR SECURING A LOAD

(75) Inventor: André Mamié, Freienbach (CH)

(73) Assignee: Spanset Inter AG, Wollerau (CH)

( * ) Notice: Subject to any disclaimer, the term of this patent is extended or adjusted under 35 U.S.C. 154(b) by 67 days.

(21) Appl. No.: 13/001,169

(22) PCT Filed: Jun. 23, 2009

(86) PCT No.: PCT/EP2009/057842  
§ 371 (c)(1),  
(2), (4) Date: Mar. 28, 2011

(87) PCT Pub. No.: WO2009/156407  
PCT Pub. Date: Dec. 30, 2009

(65) Prior Publication Data  
US 2011/0170978 A1    Jul. 14, 2011

(30) Foreign Application Priority Data

Jun. 23, 2008 (DE) .......................... 10 2008 029 403  
Aug. 7, 2008 (DE) .......................... 10 2008 036 854

(51) Int. Cl.  
*B60P 7/06* (2006.01)  
*B60P 3/073* (2006.01)

(52) U.S. Cl.  
USPC ............................................................ 410/3

(58) Field of Classification Search ................ 410/3, 23, 410/17, 101–102, 106, 108, 110, 115–116, 410/20, 10, 12  
See application file for complete search history.

(56) References Cited

U.S. PATENT DOCUMENTS

| | | | |
|---|---|---|---|
| 3,212,457 A * | 10/1965 | Looker | ......................... 410/105 |
| 3,477,104 A | 11/1969 | Lewis | |
| 3,685,778 A | 8/1972 | Berns | |
| 4,960,353 A * | 10/1990 | Thorndyke | ..................... 410/20 |
| 5,108,237 A * | 4/1992 | Zankich | ......................... 410/21 |
| 5,265,992 A | 11/1993 | Jensen | |
| 5,752,791 A * | 5/1998 | Ehrlich | ......................... 410/101 |
| 5,873,688 A | 2/1999 | Wheatley | |
| 6,171,037 B1 * | 1/2001 | Andre | ............................. 410/20 |
| 6,709,209 B2 * | 3/2004 | Zhan et al. | ..................... 410/116 |
| 7,114,897 B1 | 10/2006 | Boydstun, IV et al. | |

FOREIGN PATENT DOCUMENTS

GB    1259959    1/1972

* cited by examiner

*Primary Examiner* — Glenn Dayoan  
*Assistant Examiner* — Sunsurraye Westbrook  
(74) *Attorney, Agent, or Firm* — The Webb Law Firm (57) ABSTRACT

A load securing element with a base body includes a coupling portion for coupling a stop means, a support portion provided for insertion into an opening, and a connecting portion, which connects the coupling portion and the support portion to one another and thus keeps them spaced apart in such a way that a slot-like receiver is formed on the base body. The receiver is delimited at its upper side by the coupling portion, at its lower side by the support portion and at its rear by the connecting portion and is otherwise open, wherein the width of the receiver corresponds to a multiple of its height.

12 Claims, 6 Drawing Sheets

LOAD SECURING ELEMENT AND SYSTEM FOR SECURING A LOAD

BACKGROUND OF THE INVENTION

1. Field of the Invention

The invention relates to a load securing element and a system for securing a load, which comprises a load securing element of this type. Elements and systems of this type are required, in particular, in the transportation of vehicles on a vehicle transporter.

2. Description of the Related Art

Transporters for passenger cars or other land vehicles typically generally have tracks consisting of steel sheet, on which the vehicles to be transported can be driven for loading and unloading and on which the vehicles stand during transportation. In transporters, which can transport a plurality of passenger cars, the tracks are generally configured as narrow paths adapted to the width of the wheels of the vehicles to be transported, while in vehicles intended for individual transport, such as tow trucks, they generally extend over the entire width of the respective transport vehicle.

Independently of their shaping, the transport paths of vehicle transporters are generally provided with regularly arranged punched holes in order to ensure a good grip for the wheels of the vehicles to be transported. Moreover, the openings are used to fasten position securing devices, with which the respective vehicle is fixed during transportation. These load securing devices are stop means, typically bands or chains, which hook by their one end by means of a conventional hook in one of the openings of the transport path and are placed around the wheels of the respective vehicle.

The respective stop means is then braced by its other end by means of a tensioning device also hooked into one of the openings of the transport path. In order to ensure a secure hold of the vehicles during transportation, substantial tensioning forces are necessary. This applies, in particular, when the transport path is arranged obliquely in relation to the carriageway on which the transport vehicle is travelling. In this case, the load securing device does not only have to absorb the dynamic forces occurring during travelling, but also the weight forces caused by the vehicle's own weight.

The high tensioning forces required for a secure hold lead, at the track openings, at which the stop means of the load securing device are braced against the track, to considerable loads of the edge regions surrounding the respective opening. These can go so far that the sheet metal of the track deforms until the yield strength of the steel material is exceeded and lasting deformations or cracks are produced. If damage of this type occurs at one of the openings of the track, this can no longer be used as the hooks of the stop means and the tensioning devices required for bracing can no longer be securely hooked thereto. The damage caused by the loads occurring during the bracing of the stop means can go so far that the tracks as a whole are no longer adequately stable and accordingly have to be exchanged. A further problem is that it is no longer ensured in a deformation of the respective edge region of an opening of the transport path that the hook of the tensioning means is securely held. Rather, the risk exists of the hook sliding out of the opening as a result of the dynamic forces additionally loading it during transportation, so the respective vehicle is also no longer secured.

SUMMARY OF THE INVENTION

Against this background, the object of the invention was to provide a load securing element which is easy to handle, with which it is easily ensured that even in the case of high tensioning forces, the danger of damage to the edge regions of the respective transport path surrounding the respective opening is reduced to a minimum. Likewise, an economical system to secure a load was to be proposed, which reliably allows even heavy vehicles or vehicles positioned under unfavourable conditions to be reliably secured and with minimised danger of damage to the respective track.

In relation to the load securing element, this object was achieved according to the invention in that the load securing element is configured according to a described embodiment. Advantageous configurations and possibilities for use of a load securing element according to the invention are also disclosed.

In relation to the load securing system, the above-mentioned object was achieved according to the invention by a system configured according to another embodiment of the present invention. Advantageous configurations and possibilities for use of a load securing element according to the invention are also disclosed.

A load securing element according to the invention has a base body, which has a coupling portion for coupling a stop means, a support portion provided for insertion into an opening of the respective transport path and a connecting portion, which connects the coupling portion and the support portion to one another. At the same time, the connecting portion keeps the coupling and the support portion spaced apart in such a way that a slit-like receiver is formed on the base body.

This receiver is then limited at its upper side by the coupling portion, and its lower side by the support portion and at its rear by the connecting portion. Moreover, the receiver is open, the width of the receiver corresponding to a multiple of its height. In this manner, a metal sheet or a similar thin element can be inserted into the slot-shaped receiver unhindered.

At the same time, the width of the receiver and the accompanying large width of the receiver compared with its height ensures that the forces exerted by the load securing element on the edge region, which surrounds the respective opening, into which the load securing element is hooked with its support portion, are distributed over a comparatively large area. In this manner, an overload of the metal sheet of the transport path is reliably avoided, so the danger of damage is minimised.

The secure hold and the large-area force distribution aimed for is also supported in that with a load securing element according to the invention at least one support face is formed in the region of the area of the coupling portion associated with the receiver, a support face of the support portion being associated with said support face and opposing it. In this manner, the load securing element can be supported on the transport path depending on the direction of action of the respective tensioning force loading it via the coupling portion or the support portion.

Finally, it is ensured, since a counter-bearing face is present in a load securing element according to the invention on the side of the connecting portion remote from the receiver that the load securing element does not automatically leave the fastening opening associated with it even under unfavourable conditions. Rather, the counter-bearing face, when the support portion is inserted in an opening, is used to support the base body against the edge of the respective opening when the base body rotates under load about a rotational axis extending through the receiver and being produced by the contact of the support face of the coupling portion with the edge region surrounding the respective opening.

Owing to its design according to the invention, a load securing element which is easy to handle is available, with which it is easily ensured that the danger of damage to the edge regions of the respective transport path surrounding the respective opening is kept to a minimum even in the event of high tensioning forces.

A particular advantage of the invention is that the base body of a load securing element according to the invention can be easily produced. It is thus particularly suitable for production by forging or casting a metal material, in particular steel or aluminium.

Depending on their respectively provided type of assembly, the counter-bearing face present on the connecting portion in a load securing element according to the invention can be configured in such a way that the movements occurring in the provided use as a result of the respective load direction can be optimally absorbed. If it is assumed that the load securing element is subject to a torque being rotated into the respectively associated opening of the transport path owing to the tensioning force required in practice, a movement triggered thereby can be absorbed in that the counter-bearing face points away from the coupling portion. When the load securing element is under load, the counter-bearing face then strikes against the edge of the associated opening, so a further rotation of the element is reliably prevented. Conversely, it may likewise be expedient to arrange the counter-bearing face in such a way that it also strikes against the edge of the opening in the event of a movement of the load securing element out of the opening caused by a torque. Optimally, the counter-bearing face is therefore arranged in such a way that it, in each case, prevents, in both movement directions by striking against the edge of the opening, the load securing element moving out of the opening under load.

A particularly secure hold of the load securing element in the opening associated with it, in each case, can be ensured in that the length of the receiver corresponds to a multiple of its height. In this manner, the receiver has the shape of a deep slot with a low height. With a metal sheet inserted into the receiver, there is then a large overlap between the support portion and the coupling portion, on the one hand, and the metal sheet seated in the receiver, on the other hand. This large overlap ensures that the forces transmitted by the load securing element onto the sheet metal are introduced at a point comparatively distant from the edge of the respective opening. The danger of deformation of the sheet metal is thus additionally reduced.

The loadings of the edge of the opening associated with the load securing element in the assembled state can additionally be reduced in that the area of the connecting portion limiting the recess is configured in the manner of a throat, in which at least the corner regions at the transitions to the support faces of the coupling and support portion are rounded. A configuration of the invention particularly suitable for transport tracks, the openings of which are surrounded for the purpose of stiffening by a peripheral collar produced by a deep drawing operation, is characterised, in this case, in that the throat shape of the area of the connecting portion limiting the recess terminates in a region, which is rounded in a throat shape, of the support face of the coupling portion. In the event of a movement of the load securing element under load, the throat-shaped region of the coupling portion receives the projecting collar of the edge of the opening, so that this also remains substantially force-free.

A configuration of the invention further simplifying the handling of a load securing element according to the invention is distinguished in that a resilient element is arranged at least one of the support faces to cushion the forces loading the respective support face under load. This resilient element configured, for example, as a resilient plastics material cushion, allows a particularly simple positioning of the load securing element and, on contact with the transport path, ensures, because of the increased coefficient of friction in its region, that the element retains its position during the attachment of the respective stop means.

The diversity of a load securing element according to the invention can additionally be established in that a coupling member is fastened in an articulated manner to the coupling portion, with which coupling member, the respective tensioning or stop means can be coupled. The articulated coupling of the stop means achieved in this manner proves to be particularly expedient, in particular, when the stop means has to be guided in a direction differing from the longitudinal orientation of the transport path to fasten the respective load. It has proven to be particularly expedient for this application if the coupling member can be rotated about a rotational axis, the imaginary extension of which penetrates the support face of the coupling portion. The rotational axis is in this case typically substantially oriented in such a way that it is perpendicular to the transport path in the assembly position.

Further securing against an unintentional release of the load securing element from the opening associated with it can be achieved in that arranged on the side of the base body remote from the receiver is a securing member which can be pivoted about a pivot axis from its position pivoted onto the base body into a securing position, in which it projects at least with a bolt portion beyond the base body, so the securing element secures the base body against the edge of the associated opening. The relevant securing member may, for example, be configured as a manually actuable lever, which carries a projection, which, in the position pivoted away from the base body, engages under the edge surrounding the respective opening. In order to thus ensure that the securing element does not impede the insertion of the load securing element into the associated opening, a receiver formed into the base body may be associated with the securing member, said receiver being dimensioned such that the securing member is arranged inside the envelope of the base body in the position completely pivoted onto the base body.

A particular stable positioning of the load securing element is produced when the coupling portion projects over the support portion in its width or longitudinal direction. In this case, the coupling portion is preferably dimensioned such that it completely covers the opening respectively associated with the load securing element, in particular projects over the edges surrounding it. An optimal distribution of the forces loading the securing element during use is ensured in this manner with a simultaneously optimal seat.

In accordance with the statements above, a system according to the invention for securing a load on a transport path provided with openings comprises a load securing element configured according to the invention, a band-shaped or cable-shaped stop means, which is coupled to the load securing element during use, and a tensioning device provided with a hook for hooking into an opening of the transport path for tensioning the stop means. The hook of the tensioning device is, in this case, obviously preferably also designed in such a way that its hook face coming to rest on the edge region surrounding the associated opening overlaps over a large area in order to avoid an excessive load of the relevant edge region.

In order to ensure a particularly secure hold of the stop means even on unfavourably shaped objects, such as, for example, on the peripheral face of a vehicle wheel, the load securing system according to the invention can additionally comprise a deflection element provided with a hook for hooking into an opening of the transport path, which deflection element is provided to deflect the stop means on its way from the load securing element to the tensioning device. The deflection element can therefore be used to guide the stop means in such a way that it is guided over an optimally long path over the object to be secured in position in each case.

In order to ensure that the tensioning device is easy to handle even when the securing in position has to be carried out at a poorly accessible site and the tensioning device has a tensioning lever which can be pivoted manually about a pivot axis, a support angle arranged between the hook of the tensioning device and the pivot axis of the tensioning lever can be provided, which supports the tensioning device in such a way that an imaginary extension of the pivot axis of the tensioning level encloses an acute angle with the transport path. The correspondingly obliquely oriented tensioning lever is then easier to reach and handle from the lateral direction.

The latter proves to be particular advantageous when the system according to the invention is used for securing the position of a motor vehicle on a transport track of a vehicle transporter. Particularly in this application, for which the load securing element according to the invention and also the system according to the invention are particularly suitable, the situation frequently occurs that the tensioning device has to be arranged under the vehicle.

Obviously, the system according to the invention may also comprise a pretensioning apparatus known per se, with which a predetermined tensioning force can be precisely adjusted or it can be read off what tensioning force is prevailing in the respective stop means.

BRIEF DESCRIPTION OF THE DRAWINGS

The invention will be described in more detail below with the aid of drawings showing an exemplary embodiment, in which.

DETAILED DESCRIPTION OF THE INVENTION

Figure 1:
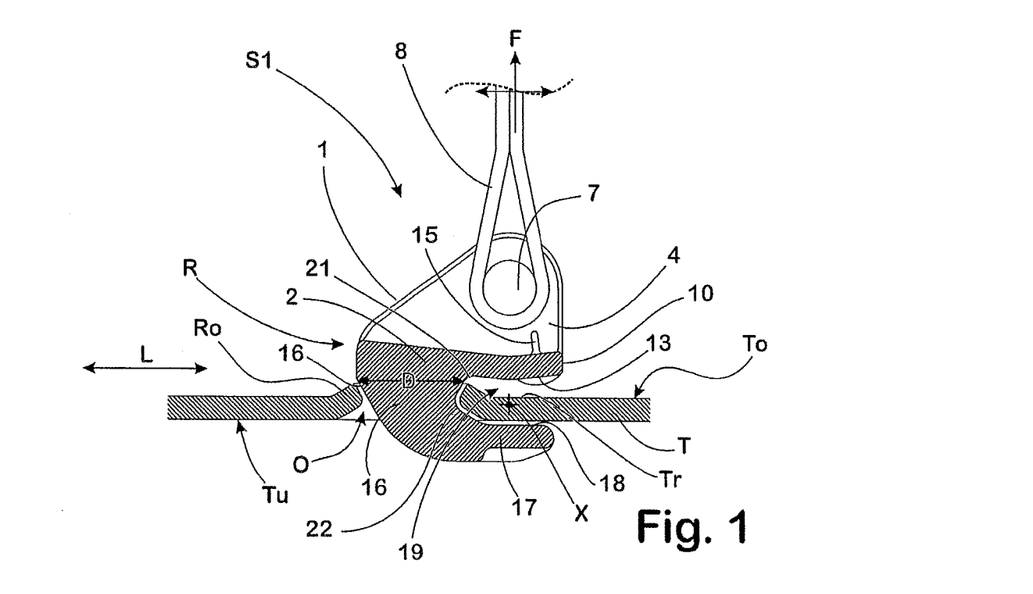
FIG. 1 shows a first configuration of a load securing element in the assembly position in a longitudinal sectional view.
Figure 2:
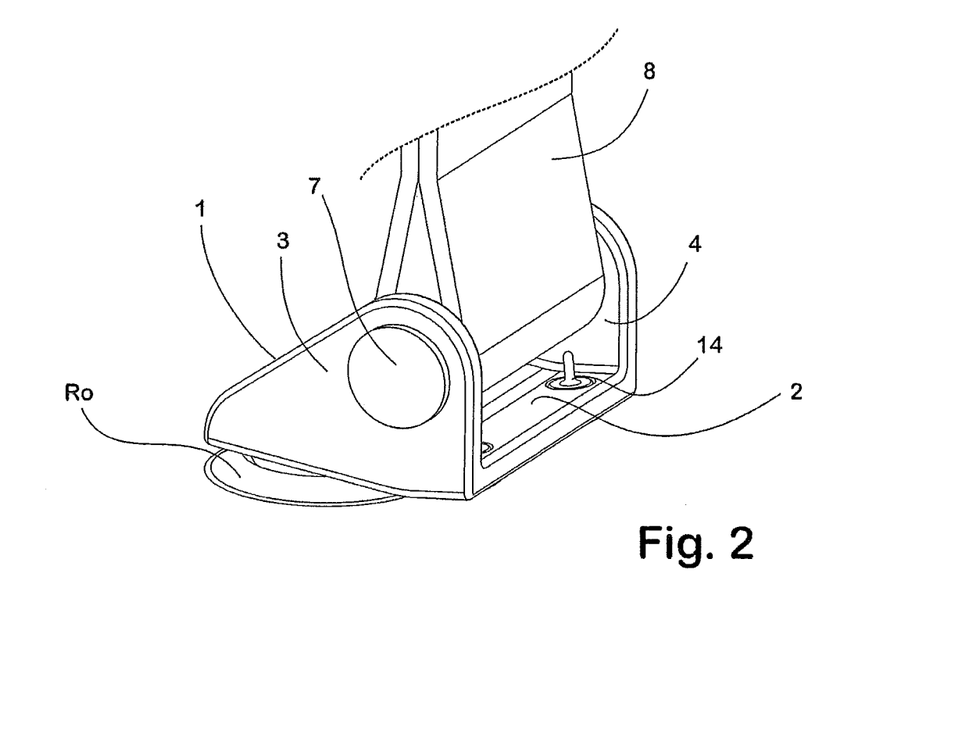
FIG. 2 shows the load securing element according to FIG. 1 in a perspective view from the top front.
Figure 3:
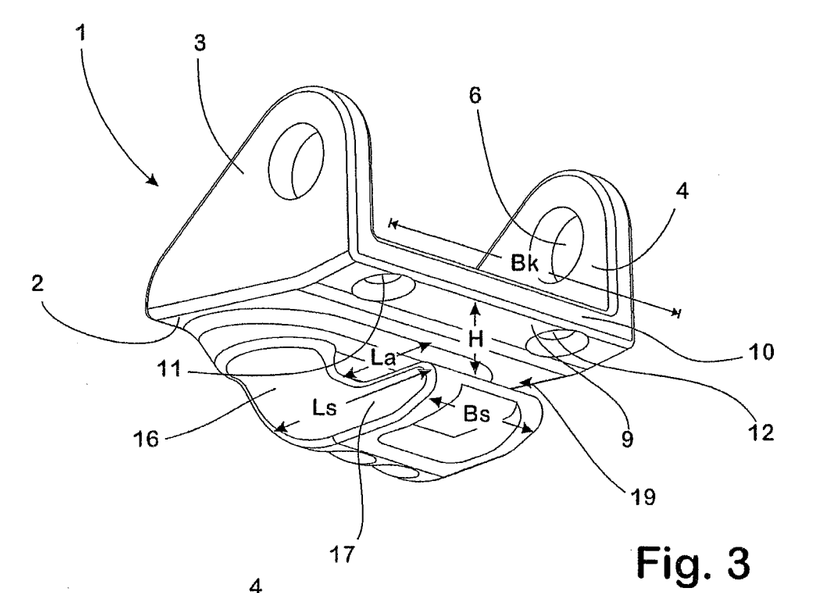
FIG. 3 shows the base body of the load securing element shown in FIGS. 1 and 2 in a perspective view from the bottom front.
Figure 4:
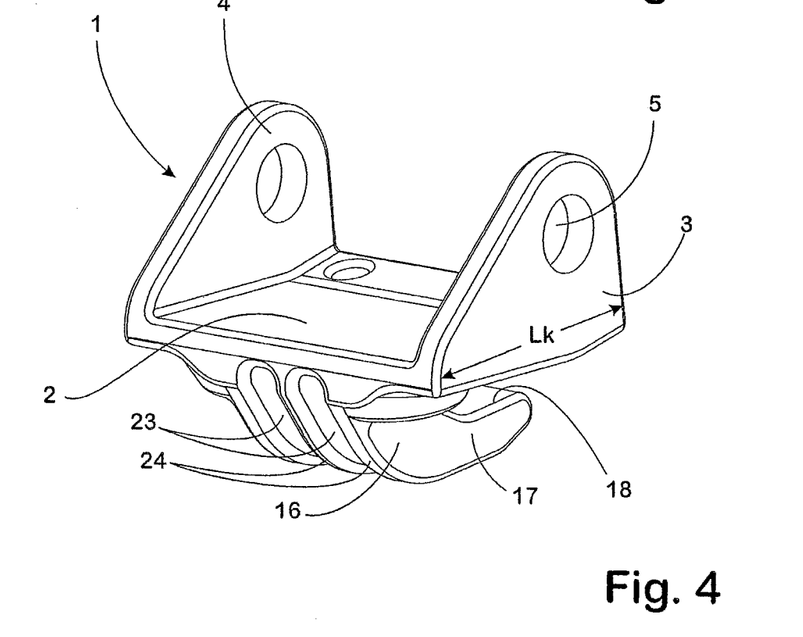
FIG. 4 shows a base body of the load securing element shown in FIGS. 1 and 2 in a perspective view from the top rear.

The load securing element S1 shown in FIGS. 1 and 2 has a base body 1, which is shown on its own in FIGS. 3 and 4.

The base body 1, in this case, has a coupling portion 2, which is U-shaped from the front in a frontal view and the legs 3, 4 of which project upwardly therefrom and in each case have a through-opening 5, 6. A fastening axle 7 extending over the width Bk of the coupling portion 2 is inserted through the through-openings 5, 6, the end loop 8 of a stop means, not further visible here, being placed around said fastening axle 7. The relevant stop means here is a wide band, the end loop 8 of which is formed in a manner known per se by turning over and sewing the end of the stop means associated with the load securing element S1.

On its lower side remote from the fastening axle 7, the coupling portion 2 has a substantially level support face 9, which adjoins the free front edge 10 of the coupling portion 2. Two through-openings 11, 12 are formed into the coupling portion 2 in the region of the support face 9, of which through-openings one is in each case arranged adjacent to the legs 3, 4. The through-openings 11, 12 taper in the direction of the upper side of the coupling portion 2 in such a way that when exiting onto the upper side of the coupling portion 2, they have a significantly smaller diameter than in the region of the support face 9.

Seated in the through-openings 11, 12, in each case, is a spring element 13, 14, which is manufactured from a resilient plastics material and which carries on its end associated with the upper side of the coupling portion 2, a prolongation 15. The latter is drawn through the respective through-opening 11,12 during assembly until the edge of the narrow opening 11, 12 in the region of the upper side of the coupling portion 2 latches into a peripheral groove, not visible here, which is formed between the prolongation 15 and the main portion of the respective resilient element 13, 14. The spring elements 13, 14 are positively held in the through-openings 11, 12 in a manner known per se, without additional means being necessary for this. The main portion thereof, in this case, fills the through-openings 11, 12 and projects over the support face 9 of the coupling portion 2. In this manner, the resilient elements 13, 14 cushion impacts when being placed on the associated upper side To of the respective transport path T and, because of an increased friction, hold the load securing element S1, while the stop means is being attached, in its position.

On its rear R remote from the free front edge 10, a connecting portion 16 is connected to the coupling portion 2 and is oriented downward pointing away from the coupling portion 2. The connecting portion 16 carries a support portion 17, which extends substantially parallel and at a spacing from the coupling portion 2 in the direction of the free front edge 10 thereof. In this case, the support portion 17 on its upper side associated with the coupling portion 2 has a support face 18, which is oriented substantially parallel to the support face 9 of the coupling portion 2.

In this manner, the support portion 17 and the coupling portion 2 limit a slit-shaped receiver 19 located between them on its upper and lower side. At its rear, the receiver 19 is limited by the connecting portion 16. All the remaining sides of the receiver 19 are open. The steel sheet material, from which the guide path T is formed, can thus be inserted in the receiver 19, without it striking against the connecting portion 16.

The support face 18 passes in a throat-shaped transition 20 into the wall face of the connecting portion 16 associated with the receiver 19. The relevant wall face of the connecting portion 16 also passes in a transition 21 rounded in a throat-like manner into the support face 9 of the coupling portion 2.

The connecting portion 16 is formed in a rounded manner at the rear R in such a way that, at this side, viewed in a side view (FIG. 1), proceeding from the coupling portion 2, it terminates in a bend in the support portion 17. The connecting portion 16, following the coupling portion 2, thus has its greatest thickness D, which continuously decreases in the direction of the support portion 17. The greatest thickness D of the connecting portion 16 at the transition to the coupling portion 2 is dimensioned here such that it is greater by a slight oversize than the width of the associated opening O of the transport path T measured in the longitudinal direction L of the transport path T. A counter-bearing face 22 is thus formed at the rear R of the connecting portion 16 adjoining the rear face of the coupling portion 2, said counter-bearing face striking against the edge Ro surrounding the opening O of the transport path T when the load securing element S1 rotates into the opening O about a rotational axis X because of forces F pointing in the direction of the rear R during use, the position of which rotational axis in the receiver 19 being determined by the contact between the support face 18 of the support portion 17 and the lower side Tu associated with it of the transport path T.

For stiffening and weight minimisation, proceeding from the rear R, indentations 23 are formed into the connecting portion 16, and are laterally delimited by a respective rib 24 and terminate in the region of the rear end of the support portion 17.

The support portion 17 projects in the manner of a tongue from the connecting portion 16 in the direction of the free front edge 10 of the base body and is oriented here substantially parallel to the coupling portion 2. Its length Ls measured in the longitudinal direction L is shorter, in this case, than the length Lk of the coupling portion 2. The width Bs of the support portion 17 is adapted to the width of the associated opening O of the transport path T in such a way that the support portion 17 can be inserted with little play into the opening O. The width Bk of the coupling portion 2 is, on the other hand, so large that the coupling portion 2 projects laterally over the opening O and, with a correspondingly oriented load F, is supported over a large area on the edge region surrounding the opening O of the transport path T (FIG. 2).

The height H of the receiver 19 determined by the spacing of the support face 18 of the support portion 17 from the support face 9 of the coupling portion 2 is dimensioned such that the sheet metal of the transport path T can be inserted with the edge Ro surrounding the opening O and curved in a collar-like manner in the direction of the upper side To of the transport path T into the receiver 19 with play. In this case, the length La of the receiver 19 measured in the longitudinal direction L is a multiple of the height H, so when the load securing element S1 is completely assembled, the coupling portion 2 and the support portion 17, on the one hand, and the edge region Tr of the transport path T surrounding the opening O overlap by such an extent that the forces absorbed by the load securing element S1 are introduced into the sheet metal of the transport path T at an adequately great spacing from the edge Ro.

Figure 5:
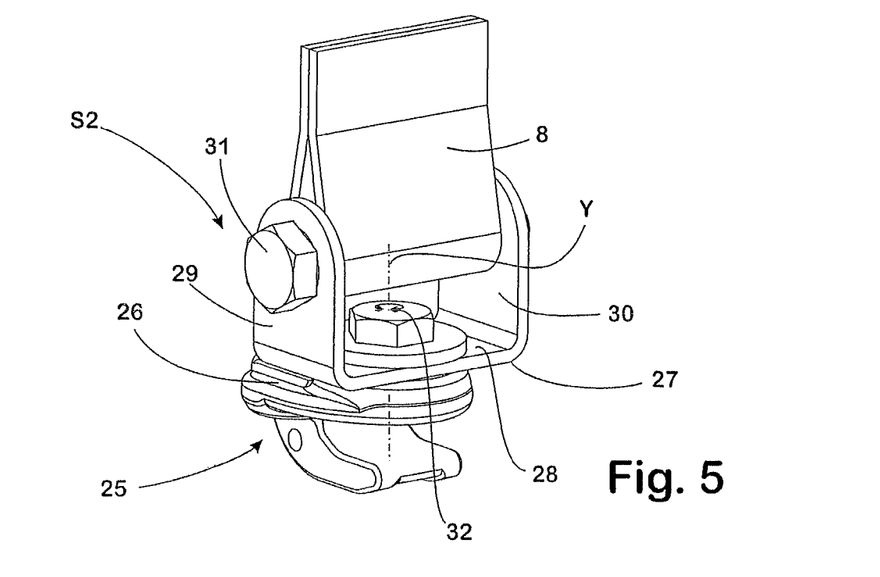
FIG. 5 shows a second configuration of a load securing element in a first assembly position in a perspective view from the top front.
Figure 6:
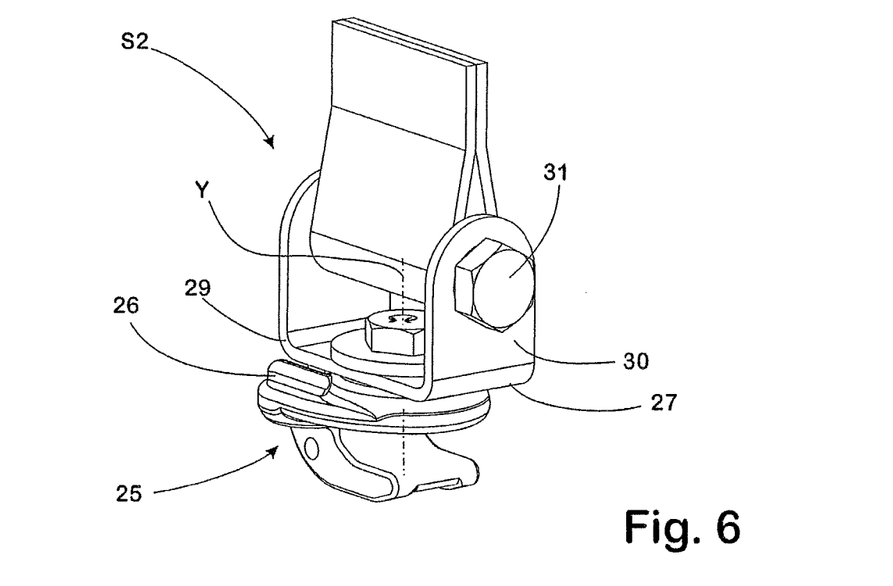
FIG. 6 shows the load securing element shown in FIG. 5 in a second assembly position in a view corresponding to FIG. 5.

The load securing element S2 shown in FIGS. 5, 6 has a base body 25, which only differs from the base body 1 in that its coupling portion 26 does not carry any legs, but that, on the coupling element 26, a coupling member 27 coupled to the respective stop means A is rotatably positioned about a rotational axis Y. The coupling member 27 is, in this case, configured in a U-shape with a base portion 28 and legs 29, 30 formed laterally on the base portion 28, in which legs a respective opening is formed. A fastening axle 31 is inserted through the openings of the legs 29, 30. The fastening axle 31 is, in this case, in turn guided through the end loop 8 of the stop means A.

An opening, which is not visible here, is formed in the base portion 28 of the coupling member 27. A screw 32 guided through this opening and screwed into a corresponding threaded opening of the coupling portion 26 forms the rotary bearing about which the coupling member 27 is rotatably mounted. The rotational axis Y of this rotary bearing is oriented in such a way here that its imaginary extension substantially perpendicularly penetrates the support face of the coupling portion 26.

Figure 7:
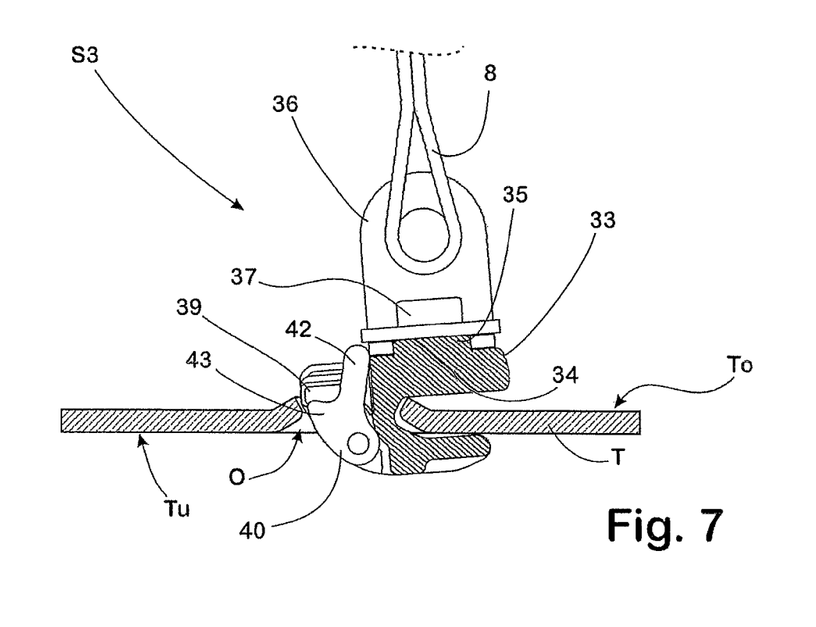
FIG. 7 shows a third configuration of a load securing element in the assembly position in a longitudinal sectional view.
Figure 8:
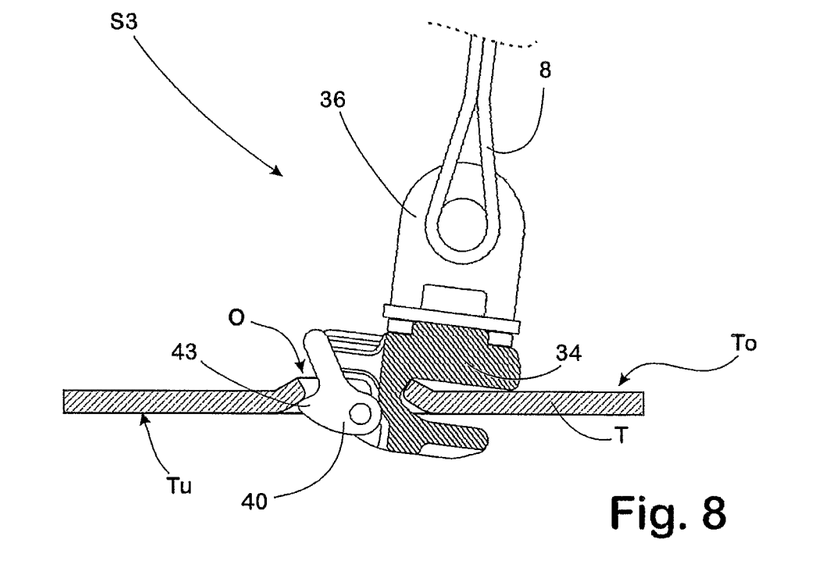
FIG. 8 shows the configuration of the load securing element shown in FIG. 7 in the assembly position in a view corresponding to FIG. 7.

The load securing element S3 shown in FIGS. 7 and 8 also has a base body 33 corresponding to the base body 1. Unlike the base body 1, the coupling portion 34 of the base body 33 does not carry any legs either, however. Instead, on the upper side of the coupling portion 34, a projection 35 extending over the width thereof is formed. This projection 35 positively engages in a groove, which is configured on the associated lower side of a coupling member 36. The position of the coupling member 36 relative to the base body 33 is thus fixed. The coupling member 36 is additionally securely connected to the base body 33 by means of a screw 37 screwed into the base body 33.

Seated in the region of the indentations 39 formed into the rear of the connecting portion 38 of the base body 33 is a respective securing element 40 which is in each case configured in the manner of a lever and can be pivoted about an axis 41 oriented transverse to the longitudinal direction L of the coupling member 36. The securing element 40 in this case has an upwardly pointing lever portion 42 and a bolt portion 43 which is formed onto the lever portion 42 and which is oriented pointing away from the base body 33. In this case, the shape of the bolt portion 43 and its orientation are selected such that the bolt portion 43, when the securing element 40 is pivoted onto the base body 33, is completely received in the indentation 39 associated with it in each case. The bolt portion 43 of the securing element 40 does not project out of the envelope of the base body 33 in this position, so the support portion 44 and the connecting portion 45 of the base body 33 can be guided unhindered into the associated opening O (FIG. 7).

As soon as the assembly position has been reached (FIG. 8), the securing elements 40 are pivoted away from the base body 33, so the bolt portion 43 thereof engages under the lower side Tu of the transport path T. The securing element 40 thus secures the load securing element S3 even under unfavourable loads against unintentional falling out of the opening O.

Figure 9:
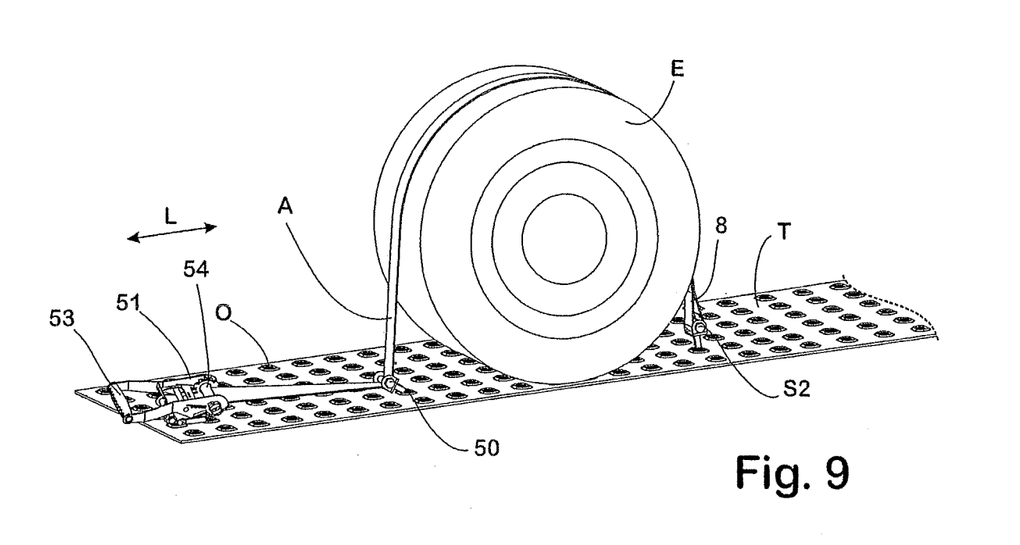
FIG. 9 shows a system for the load securing of a motor vehicle on a transport path of a transport vehicle in a perspective view.

The system shown in FIG. 9 for securing a passenger car on the transport path T comprises one of the load securing elements S1, S2 or S3 described above (a load securing element S2 indicated here), a deflection element 50 and a tensioning device 51.

While the load securing element S2 on one side of a wheel E of the passenger car to be secured, not shown further here, is hooked into one of the openings O of the transport path T, the deflection element 50, viewed in the longitudinal direction L, on the other side of the wheel E, is hooked into another opening O by means of a hook distributing the occurring load over a large area on the lower side Tu of the transport path T.

Figure 10:
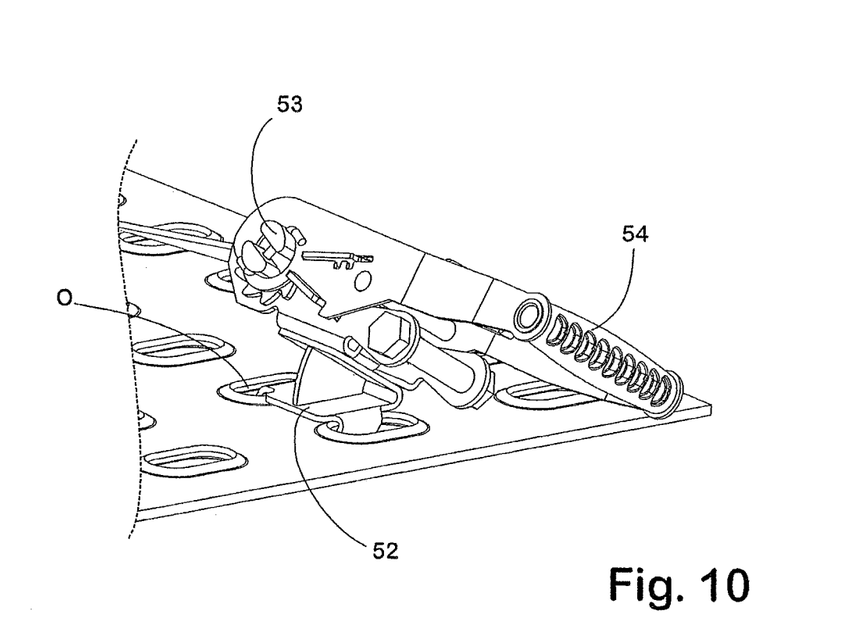
FIG. 10 shows a tensioning device used in the system according to FIG. 9 in a perspective view.

The tensioning device 51 is configured in the manner of a conventional manually actuable tensioning ratchet and comprises a tensioning lever 53, which can be pivoted about a pivot axis 54. In this case, the tensioning device 51 is hooked by means of two hooks in two openings O of the transport path T distanced still further than the deflection element 50 from the wheel E, viewed in the longitudinal direction L.

The relevant hooks are fastened to an angle piece 52. The latter supports the tensioning device 51 in such a way that its pivot axis 54 oriented transverse to the longitudinal direction L and with it the tensioning lever 53 enclose an acute angle with the transport path T. The tensioning lever 53 can thus be moved to actuate the tensioning device 51 in a direction pointing upwardly and to side of the transport path T. This allows the tensioning device 51 to be actuated without problems even when the body of the passenger car to be secured is above it.

The stop means A with its end loop 8 is coupled to the load securing element S2 in the manner already described above. From the load securing element S2, the stop means A is guided over the periphery of one of the wheels E of the passenger car, not shown further here, until it is deflected at the deflection element 50 in the direction of the tensioning device 51. By actuating the tensioning device 51, the stop means A can be tensioned until a tensioning force adequate to secure the position is produced.

Figure 11:
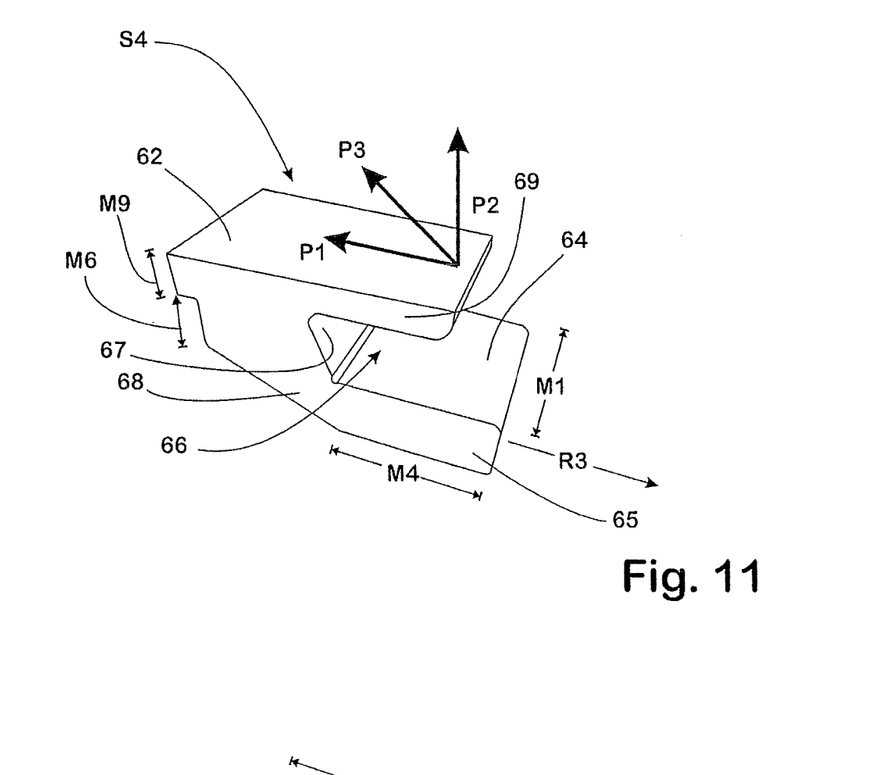
FIG. 11, 12 show a further configuration of a load securing element in two perspective views.
Figure 12:
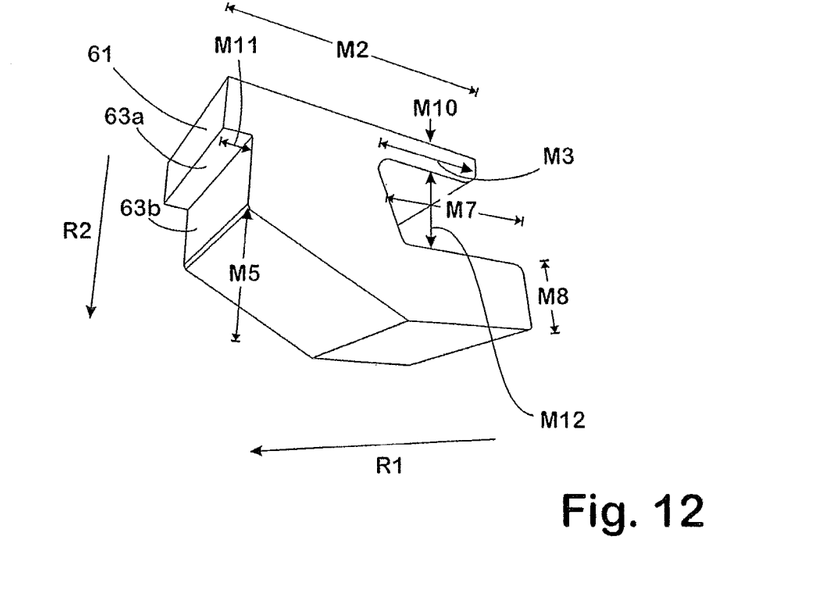

With the aid of the load securing element S4 shown in FIGS. 11 and 12, the design in principle of an element according to the invention is described again as already shown in the priority-substantiating German Patent Applications 10 2008 029 403.9 and 10 2008 036 854.7, the content of which is fully incorporated into the present patent application.

In the load securing element S4, for example, the areas 61 and 62 can be used to connect the load securing element S4 to the stop means A. In this case, the respective load F is typically introduced in a freely selectable range of 90° in the region spanned by the arrows P1, P2 shown here into the area 61, while the area 5 can additionally be used if necessary to introduce the load in the direction R1. An orientation of the force introduction which is typical in practice is indicated by the arrow P3 in FIG. 11.

A first counter-bearing face 63a, with which the load securing element S4 is supported on the edge region surrounding the opening O, acts to stop the load securing element S4 sinking in the direction R2 into the respectively associated opening O.

A second counter-bearing face 63b, with which the load securing element S4 is supported when there is a corresponding load against the edge of the opening O, counteracts the load securing element S4 sliding in the direction R1. As result, it can be ensured that the support face 64 of the support portion 65 of the load securing element S4 always rests over the whole area on the associated lower side Tu of the transport path T.

The face 67 of the connecting portion 68 of the load securing element S4 limiting the receiver 66 of the load securing element S4 at its rear prevents sliding in the direction R3 in the assembly position.

The measure M1 (width of the support portion 65) is at least designed such that, in connection with the measure M2 (length of the coupling portion 69 of the load securing element S4), it offers the greatest possible abutment face.

The measure M3 (length of the projection of the coupling portion 69 over the receiver 66) is at most such that the load receiving element S4 can be easily assembled.

The measure M4 (length of the support portion 65) and M5 (height of the rounded or bevelled rear region of the connecting portion 68) is such that the load receiving element S4 can be easily assembled.

The measure M6 (height of the counter-bearing face 63b) is at least such that the load receiving element S4 in the direction R1 to the greatest possible extent rests with the counter-bearing face 63b on the associated opening O of the transport track T generally designed as a slot.

The measure M3 is designed here in conjunction with the measure M7 (length of the receiver 66) in such a way that the load securing element S4 can be easily assembled and a secure hold is produced in the direction R3 and in the direction R1.

The measure M8 (height of the support portion 65) is configured such that it can absorb the load on it in practical use without plastic deformation. The same applies to the measure M9 (height of the rear prolongation of the coupling portion 69) and the measure M10 (thickness of the projection of the coupling portion (69) over the receiver 66).

The measure M11 (length of the rear projection of the coupling portion 69) is designed such that the load securing element S4 can be supported with its counter-bearing face 63a securely on the respective edge region of the associated opening O.

The measure M12 (height of the receiver 66) is configured such that the load securing element S4 can easily be assembled in the associated opening O of the transport path T.

The invention claimed is:

1. A load securing element with a base body, comprising: a coupling portion for coupling a stop means, a support portion provided for insertion into an opening, and a connecting portion, which connects the coupling portion and the support portion to one another and thus keeps them spaced apart in such a way that a slot-like receiver is formed on the base body, which receiver is delimited at its upper side by the coupling portion, at its lower side by the support portion and at its rear by the connecting portion and is otherwise open, wherein the width of the receiver corresponds to a multiple of its height, at least one support face being formed in the region of the face of the coupling portion associated with the receiver, a support face of the support portion being associated with the support face being formed in the region of the face of the coupling portion and opposing it, a counter-bearing face being present on the side of the connecting portion remote from the receiver, said counter-bearing face, when the support portion is inserted in an opening, being used to support the base body against the edge of the respective opening, when the base body rotates under the load about a rotational axis extending through the receiver and being produced by the contact of the respective support face of the support portion or the coupling portion with the edge region surrounding the respective opening, wherein a coupling member, to which the respective tensioning or stop means can be coupled, is fastened to the coupling portion in an articulated manner, the coupling member being rotatable about a rotational axis, the imaginary extension of which penetrates the support face of the coupling portion.

2. The load securing element according to claim 1, wherein the counter-bearing face points away from the coupling portion.

3. The load securing element according to claim 1, wherein the length of the receiver corresponds to a multiple of its height.

4. The load securing element according to claim 1, wherein the face of the connecting portion limiting the recess is formed in the manner of a throat, in which at least the corner region at the transitions to the support faces of the coupling and support portion are rounded.

5. The load securing element according to claim 4, wherein the throat form of the face of the connecting portion limiting the recess terminates in a throat-shaped rounded region of the support face of the coupling portion.

6. The load securing element according to claim 1, wherein a resilient element for cushioning the forces loading the respective support face is arranged on at least one of the support faces.

7. The load securing element according to claim 1, wherein arranged on the side of the base body remote from the receiver is a securing member, which can be pivoted about a pivot axis from a position pivoted onto the base body into a securing position, in which it secures the base body against the edge of the opening, into which the support portion of the base body is inserted.

8. The load securing element according to claim 7, wherein a receiver formed into the base body is associated with the securing member, which receiver is dimensioned such that the securing member, at least in its position completely pivoted onto the base body, is arranged inside the envelope of the base body.

9. The load securing element according to claim 1, wherein the coupling portion, in its width or longitudinal direction, extends beyond the support portion.

10. A system for securing a load on a transport path provided with openings, comprising a load securing element formed according to claim 1, a band-shaped or cable-shaped stop means, which is coupled to the load securing element during use, and a tensioning device provided with a hook for hooking into an opening of the transport path to tension the stop means.

11. The system according to claim 10, further comprising a deflection element provided with a hook for hooking into an opening of the transport path, wherein the deflection element is provided to deflect the stop means on its path from the load securing element to the tensioning device.

12. The system according to claim 10, wherein the tensioning device comprises a tensioning lever, which can be pivoted manually about a pivot axis, and in that a support angle arranged between the hook of the tensioning device and the pivot axis of the tensioning lever supports the tensioning device in such a way that an imaginary extension of the pivot axis of the tensioning lever encloses an acute angle with the transport path.

\* \* \* \* \*

UNITED STATES PATENT AND TRADEMARK OFFICE
CERTIFICATE OF CORRECTION

PATENT NO. : 8,439,610 B2  
APPLICATION NO. : 13/001169  
DATED : May 14, 2013  
INVENTOR(S) : André Mamié

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 162 days.

Signed and Sealed this
Eighth Day of September, 2015

Michelle K. Lee
*Director of the United States Patent and Trademark Office*